Jan. 27, 1931.    W. A. BRADEN    1,790,616
MEANS FOR CONTROLLING THE DIRECTION OF MOTION OF AUTOMOBILES
Filed March 20, 1929    2 Sheets-Sheet 1
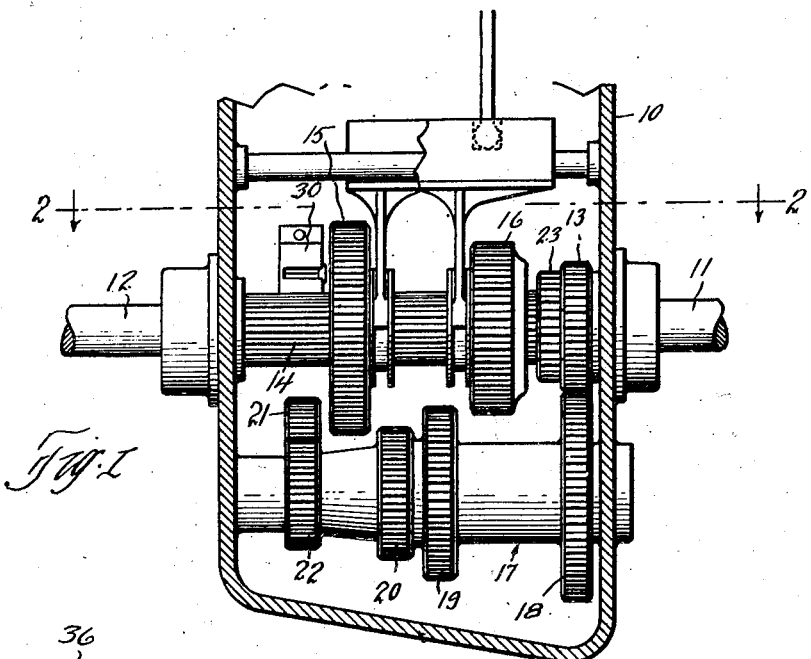
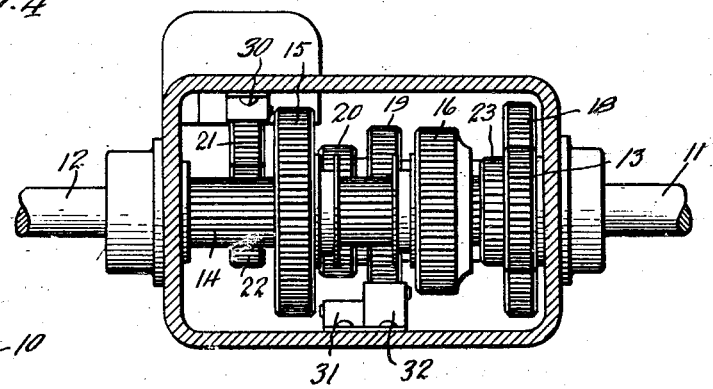
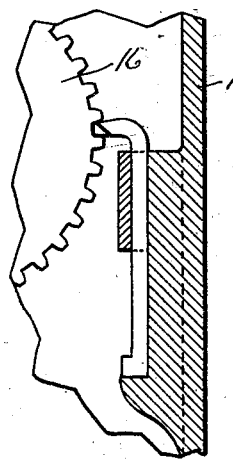
INVENTOR
William A. Braden
BY
Hull, Brock & West
ATTORNEY Jan. 27, 1931.  W. A. BRADEN  1,790,616
MEANS FOR CONTROLLING THE DIRECTION OF MOTION OF AUTOMOBILES
Filed March 20, 1929  2 Sheets-Sheet 2
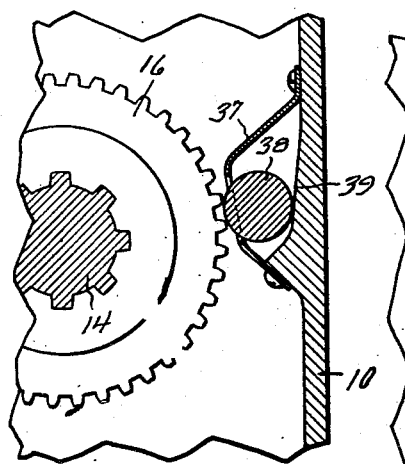
Fig. 5
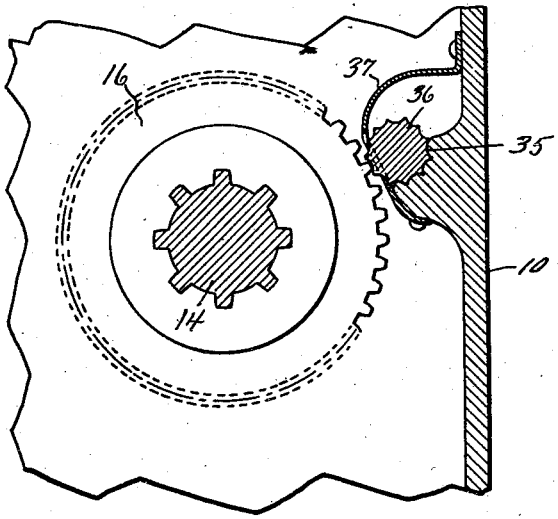
Fig. 3
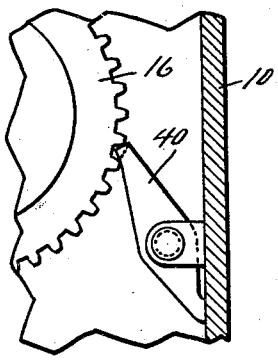
Fig. 6
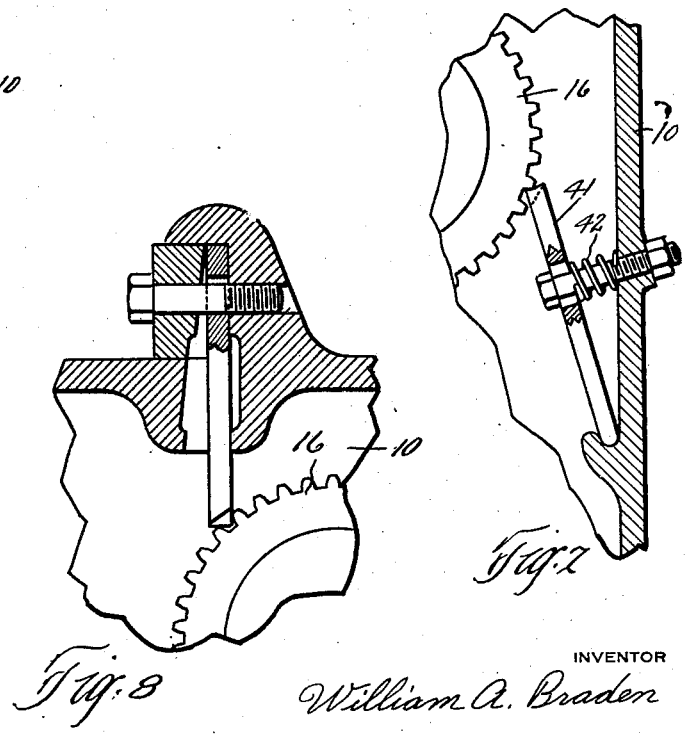
Fig. 8
Fig. 2
INVENTOR
William A. Braden
BY
Hull, Brock & West
ATTORNEY Patented Jan. 27, 1931

1,790,616

UNITED STATES PATENT OFFICE

WILLIAM A. BRADEN, OF CLEVELAND, OHIO, ASSIGNOR OF FORTY-NINE PER CENT TO JAMES A. CORWIN, OF CLEVELAND, OHIO

MEANS FOR CONTROLLING THE DIRECTION OF MOTION OF AUTOMOBILES

Application filed March 20, 1929. Serial No. 348,418.

This invention relates to means for controlling the direction of motion of automobiles and particularly to means for preventing the reverse rotation of the sliding gears of the transmission when in operative position.

The object of my invention is to provide means which will prevent back movement of the car when the gears are set for forward motion and which will prevent forward motion of the car when the gears are set for reverse.

A further object is to provide means for engaging the sliding gears of the transmission so that the non-reversing mechanism is automatically engaged and disengaged when the gears are moved into or out of operative position.

A further object is to provide means for preventing reverse motion of the gears which is simple in construction and positive in operation.

In the drawings Fig. 1 is a vertical section through a transmission showing the arrangement of gears and the non-reversing device for the reverse gear in elevation; Fig. 2 is a horizontal section of the transmission on line 2—2 of Fig. 1, with the shifting arms removed; Fig. 3 is an enlarged detail sectional view of the gear locking means illustrated in Figs. 1 and 2 in engagement with one of the sliding gears illustrated in elevation; Fig. 4 is an enlarged elevation of the gear locking member illustrated in Fig. 1 to 3; Fig. 5 is a view similar to Fig. 3 showing a modified form of locking member; Figs. 6, 7, 8 and 9 illustrate various modifications of the locking means to prevent reverse rotation of the transmission gears.

In describing my invention reference is made to the accompanying drawings in which like reference numerals designate like parts in the several views. The transmission housing designated generally by the reference numeral 10 has journaled therein in the usual manner the drive shaft 11 and the driven shaft 12, these shafts being independently operable. The drive shaft is provided with a main drive gear 13 and the driven shaft 12 with a splined portion 14 with its inner end journaled in the usual manner in the drive gear 13. Slidably received on the splined portion 14 is the low and reverse sliding gear 15 and the high and second sliding gear 16. Journaled on a shaft in the casing 10 parallel with the drive shaft is the countershaft cluster gear 17 with the gear 18 always in mesh with the main drive gear 13. In the cluster are gears 19 and 20 with which the sliding gears 16 and 15 respectively mesh when slid to their operative positions on the shaft 14. A reverse idler gear 21, with which the gear 15 meshes when shifted on the shaft 14, is journaled in the usual manner and is constantly in mesh with the gear 22 in the countershaft cluster. The high and second speed sliding gear 16 is provided with a toothed socket which engages on the portion 23 of the main drive gear 13 when the gear 16 is shifted forward and provides a direct connection between the drive shaft 11 and driven shaft 12.

The transmission so far described is the common form of sliding gear transmission the operation of which is well known to any one skilled in the art.

In carrying out my invention I provide means to prevent the gears 15 and 16 from rotating in a direction reverse to their normal direction of rotation when they are shifted into their operative positions. To accomplish this I provide at 30 means with which the gear 15 will engage when shifted to operate the shaft 12 in a direction reverse to the direction of rotation of the shaft 11, and at 31 similar means to engage the same gear when it is shifted into the low speed position. At 32 I provide similar means to engage the gear 16 when it is shifted to the intermediate or second speed position.

In the form of device illustrated in Figs. 1 to 4 inclusive, each of these locking means comprises a cam or wedging seat 35, integral with the casing 10, and in a plane parallel with the axis of rotation of the gears, on which is held a longitudinally serrated roller 36 by means of a guard or retainer 37 shown in detail in Fig. 3. The cam or wedge seat is provided with serrations corresponding to the serrations on the roller 36 to prevent slipping of the roller thereon, and is close enough to the gear wheel 15 so that when the gear turns clockwise in the illustration in Fig. 3 the roller 36 will wedge tightly between the seat 35 and the teeth on the gear wheel. When the gear turns counter-clockwise, in its normal direction the roller is thrown upward away from the wheel by the gear and the thick oil, with which the transmissions of this type are filled, forms a film between the wheel and roller due to the centrifugal action of the gear wheel and cushions the roller as it rides thereon. To prevent the roller 36 from interfering with the shifting of the gears the end facing the gear is beveled as shown at 36ª.

In Fig. 5, I have illustrated a modified form of locking member which comprises a smooth roller 38 which operates against a wedging seat 39 of a greater angle than in the form of Fig. 3, the operation, however, being the same.

In Fig. 6, I have shown a pivoted dog 40 which falls by gravity against the wheel and prevents reverse rotation thereof.

In Fig. 7, a spring pressed pawl 41 is shown. The spring 42 insures contact of the pawl in the gear teeth when the gear starts to rotate in a direction reverse to normal.

In Figs. 8 and 9 other forms of pawls are illustrated which are particularly applicable in heavy duty machines.

The edge of the pawl which the gear first strikes when shifted into contact therewith in each of the forms illustrated in Figs. 6, 7, 8 and 9 is beveled to prevent any possible chance of the pawl engaging the edge of the teeth and preventing the gear from being shifted.

It is obvious that when the gears 15 and 16 are in neutral they are free to rotate in either direction so that the car or other machine may be moved about as desired by outside force.

In operation, however, when the gear 15 is shifted to reverse the locking device 30 will prevent the car rolling forward in case the engine is stalled and by merely disengaging the clutch, the engine may be started without keeping the foot on the brake or without using the hand brake.

The locking devices 31 and 32 with which the gears 15 and 16 engage when they are shifted to low or second speeds, prevent the car from rolling backward on any slope and permit the operator to have both feet free for use on the clutch, and starter or accelerator without engaging and disengaging the hand brake.

In high speed there is no need for locking means, since in case the car is stalled in high, one must immediately shift to second or low before again starting, and in case it is desired to turn the engine backward it is still possible to do so by throwing the transmission in high and moving the car backward. This is necessary in some instances to release a starter pinion when stuck or when repairs are being made. With the non-reversing lock on all speeds it would be impossible without special tools.

In case it was desired to have the non-reversing lock in high as well as the other speeds, it is obvious that a fourth lock would be provided with which the gear 16 would engage when shifted to the right in the device illustrated in Fig. 1.

Having thus described my invention, what I claim is:—

1. In a sliding gear transmission including a casing, a driving shaft and a coaxial driven shaft journaled in said casing, clutch means for connecting said shafts end to end, a countershaft journaled in said casing parallel to said shafts, a gear non-rotatably mounted on said driving shaft, a first countershaft gear non-rotatably carried by said countershaft and at all times meshing with said first gear, a second countershaft gear non-rotatably carried by said countershaft and spaced from said first countershaft gear, a sliding gear splined on said driven shaft and adapted to be moved into and out of mesh with said second countershaft gear, and a pawl carried by said housing and being of such a size and so positioned that it is aligned with and engages said sliding gear only when the same is in mesh with said second countershaft gear.

2. In a sliding gear transmission including a casing, a driving shaft and a coaxial driven shaft journaled in said casing, clutch means for connecting said shafts end to end, a countershaft journaled in said casing parallel to said shafts, a gear non-rotatably mounted on said driving shaft, a first countershaft gear non-rotatably carried by said countershaft and at all times meshing with said first gear, a second countershaft gear non-rotatably carried by said countershaft and spaced from said first countershaft gear, a sliding gear splined on said driven shaft and adapted to be moved into and out of mesh with said second countershaft gear, and a pawl carried by said housing and being of such a size and so positioned that it is aligned with and engages said sliding gear only when the same is in mesh with said second countershaft gear, said transmission including means for moving said sliding gear through a predetermined throw, the width of said pawl being less than the length of said throw.

In testimony whereof I hereunto affix my signature.

WILLIAM A. BRADEN.